Figure 1:
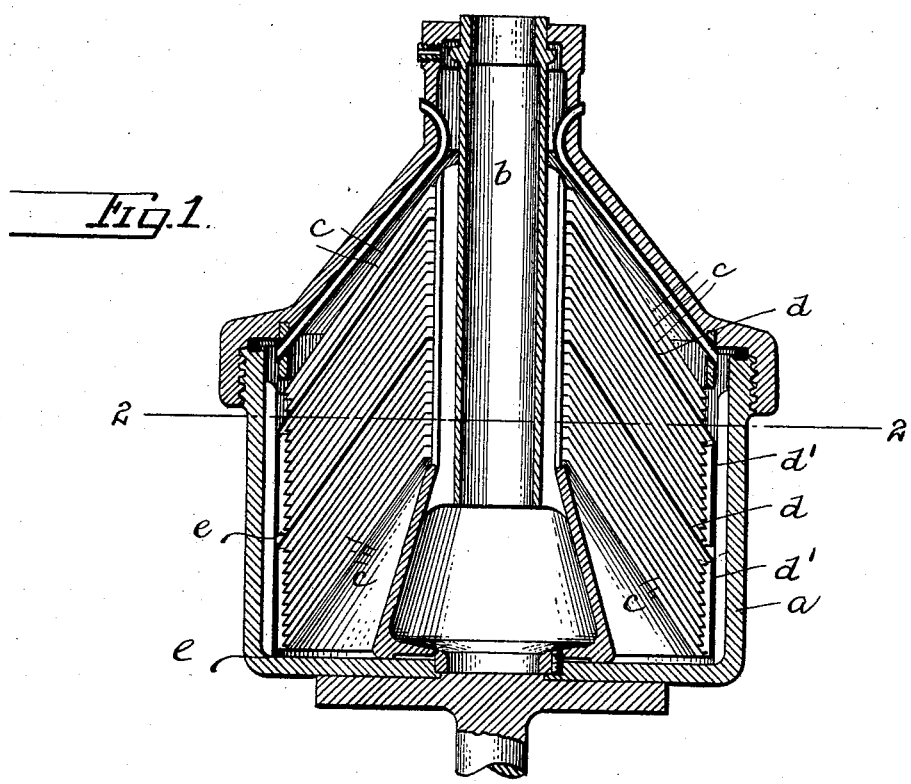

No. 637,070.  
J. J. BERRIGAN.  
CENTRIFUGAL CREAMER.  
(Application filed Mar. 7, 1898.)  
Patented Nov. 14, 1899.

(No Model.)  
2 Sheets—Sheet 1.

Witnesses.  
Jesse B. Heller  
Frank S. Busser

Inventor.  
John Joseph Berrigan  
Harding & Harding  
Attorneys

No. 637,070. Patented Nov. 14, 1899.
J. J. BERRIGAN.
CENTRIFUGAL CREAMER.
(Application filed Mar. 7, 1898.)

(No Model.) 2 Sheets—Sheet 2.

Witnesses.
Jesse B. Heller
Frank S. Bussier

Inventor.
John Joseph Berrigan
W. Harding Harding
Attorneys.

THE NORRIS PETERS CO., PHOTO-LITHO., WASHINGTON, D. C.

UNITED STATES PATENT OFFICE.

JOHN JOSEPH BERRIGAN, OF STOCKHOLM, SWEDEN, ASSIGNOR TO THE AKTIEBOLAGET SEPARATOR, OF SAME PLACE.

CENTRIFUGAL CREAMER.

SPECIFICATION forming part of Letters Patent No. 637,070, dated November 14, 1899.

Application filed March 7, 1898. Serial No. 672,833. (No model.)

*To all whom it may concern:*

Be it known that I, JOHN JOSEPH BERRIGAN, a citizen of the United States, residing at Stockholm, Sweden, have invented a new and useful Improvement in Centrifugal Creamers, of which the following is a full, clear, and exact description, reference being had to the accompanying drawings, which form a part of this specification.

This invention relates to improvements in that class of centrifugal creamers in which in the liquid-space of the bowl there are plates of such form or so placed as to cross the radial line, so as to thus divide the liquid in the bowl into lamina or strata. The preferred form of the plate is that of a frustum of a cone, and in the most preferred form, such as shown in United States Letters Patent No. 432,719, dated July 22, 1890, there are a series of such disks or plates superposed and spaced apart. In all cases there is left a space between the periphery of the bowl and the lower edge of said plate or plates, so that in action the skim or blue milk passes down the plate to the space between it and the periphery of the bowl, where it ascends to the blue or skim milk outlet, the cream moving toward the center. In practice with these devices it occurs that the full milk does not always distribute itself equally from the bottom to the top of the bowl.

My invention has for its object to cause an equal distribution of the full milk from the bottom to the top of the bowl in this class of machines, and thus increase the effectiveness of the separation. I accomplish this by connecting an upright wall to one of the inclined plates, or a plurality of such walls severally to a plurality of inclined plates, or by having such wall or walls independent of the inclined plates. In the drawings, these walls are two in number and are shown as downward extensions, severally, from two of said inclined plates and are in the form of substantially hollow cylindrical or annular walls that extend in an upright direction—in other words, walls that are either precisely vertical or have a slight inclination to be vertical, there being a space between said vertical or slightly-inclined walls and the periphery. By such addition when the blue milk passing toward the periphery of the bowl along the inclined plate or plates reaches the additional vertical or slightly-inclined annular plate or plates its direction is changed. This will somewhat restrain the outflow of the blue milk and create counter-pressure, which on lines of least resistance will cause the incoming full milk to move higher up in the bowl until the bowl from bottom to top is filled.

I will now describe the preferred embodiment of my invention, which is in connection with division-plates such as shown and described in the United States Letters Patent No. 432,719, heretofore spoken of, wherein the division-plates consist of a series of superposed disks each in the form of a frustum of a cone, although, unless specifically so claimed, I do not intend to limit my invention to the precise form and arrangement of division-plates shown therein.

Figure 2:
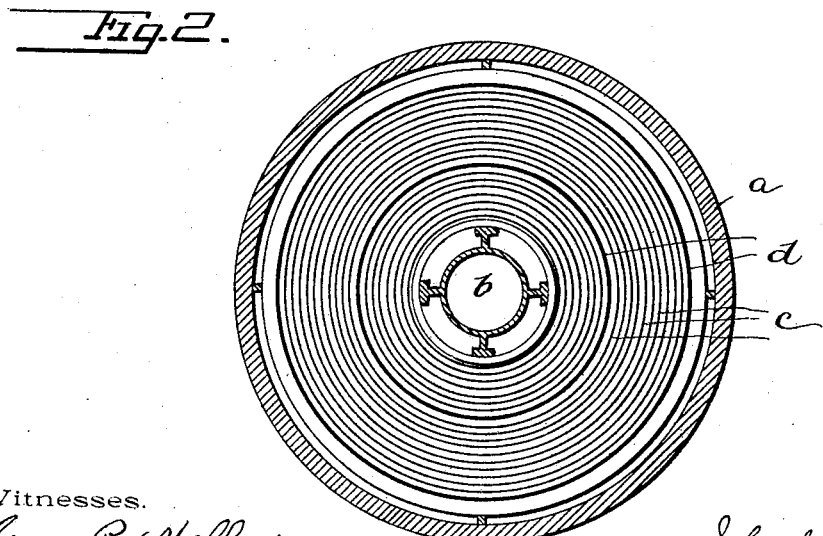
Figure 3:
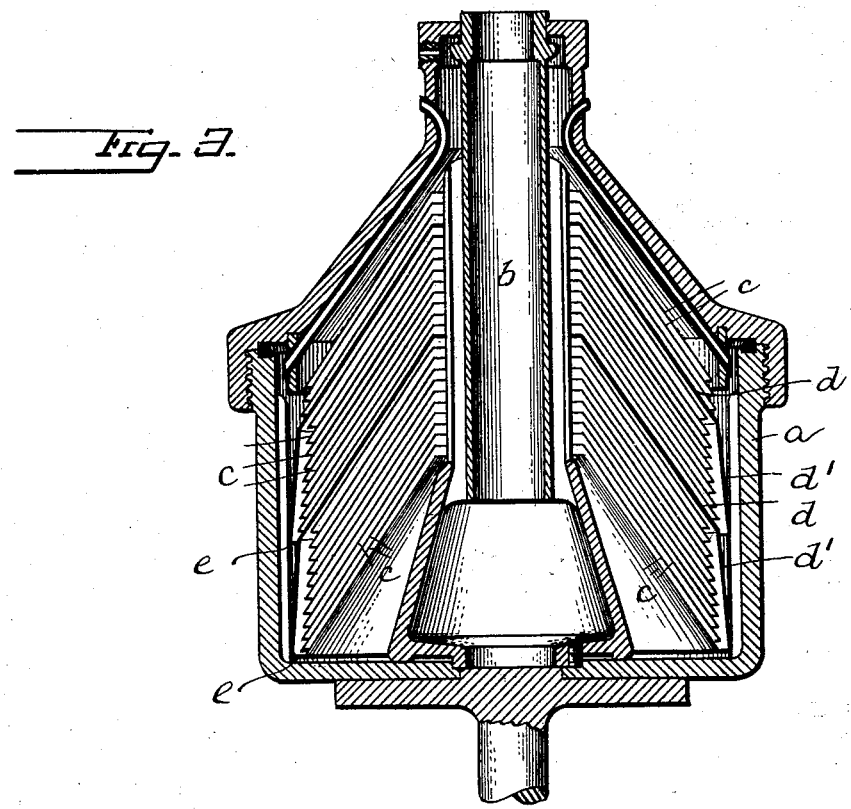
Figure 4:
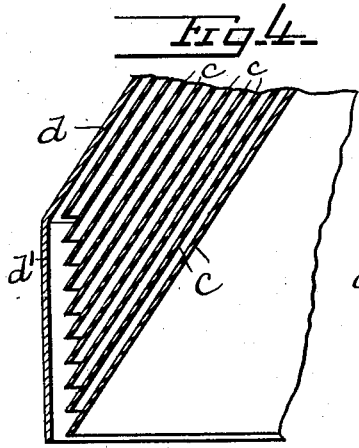
Figure 5:
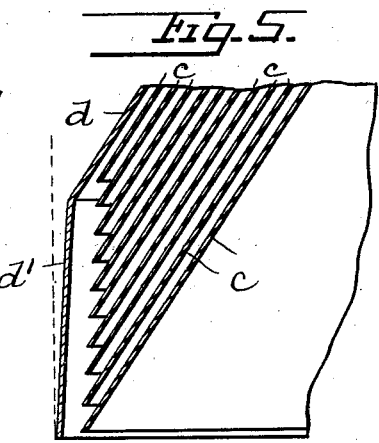
Figure 6:
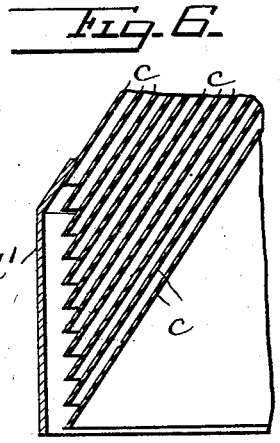

In the drawings, Figure 1 is a vertical section through the bowl of the separator. Fig. 2 is a section on the line 2 2, Fig. 1. Fig. 3 is a similar view of a modified form. Fig. 4 is an enlarged detail, in section, of the disks of Fig. 1. Fig. 5 is a similar view of the disks of Fig. 3. Fig. 6 is a similar view of the disks of another modified form.

$a$ is a centrifugal bowl.

$b$ is the central feed-pipe.

$c$ are a series of conical superposed spaced plates.

$d'$ are superposed spaced cylindrical plates, which, as shown in Figs. 1 and 3, are connected to conical plates $d$, conforming to the plates $c$. As shown, each of the plates $d'$ is of size sufficient to bridge a plurality of the plates $c$ and are so placed as to leave a space between them and the periphery of the bowl and between the plate $c$ and plates $d'$.

In operation the full milk passes through passage $b$ into the bowl, and under the action of centrifugal force the blue milk passes down the plates $c$ until it reaches the plates $d'$. The direction of the flow of the blue milk is then changed, as it is forced to pass downward and radially outward through the narrow annular openings $e$, one formed between the lower plate $d'$ and the bottom of the bowl, the other between the upper and lower plates $d'$. By thus restricting the outflow for the blue milk the flow thereof is retarded, causing a counter-pressure in the blue milk along the plates c, and the full milk entering will rise higher in the bowl, and this action will tend to cause the full milk to be equally distributed through the bowl.

In Figs. 3 and 5 I have shown the annular plates d' made with their walls slightly inclined from the vertical or slightly conical. Instead of inserting the plates d, as shown in Figs. 1 and 3, they may be formed as vertical or slightly-conical plate-casings, soldered or otherwise secured to the plates c, as shown in Fig. 6.

As stated before, I do not intend to limit myself to the precise form of division-plates as shown in the drawings or the number thereof; but,

Having now fully described my invention, what I claim, and desire to protect by Letters Patent, is—

1. In a centrifugal creamer, the combination, with a series of superposed conical division-plates extending toward, and terminating opposite, but not contacting with, the periphery of the bowl, the outer ends of said division-plates terminating in substantially the same upright plane, of an upright annular wall, interposed between the outer ends of the division-plates and the periphery of the bowl, forming passages respectively between said annular wall and the periphery of the bowl, and between said annular wall and the outer ends of said division-plates.

2. In a centrifugal creamer, the combination, with a series of superposed conical division-plates extending toward, and terminating opposite, but not contacting with, the periphery of the bowl, of a conical division-plate corresponding to the form and inclination of the first-named division-plates, a downward extension therefrom in the form of an annular wall interposed between the outer ends of said first-named plates and the periphery of the bowl, forming passages respectively between said annular wall and the periphery of the bowl, and between said annular wall and the outer ends of said first-named plates.

3. In a centrifugal creamer, the combination with a series of superposed conical division-plates extending toward and terminating opposite, but not contacting with, the periphery of the bowl, of a conical division-plate corresponding to the form and inclination of the first-named division-plates, a downward extension therefrom in the form of an annular wall interposed between the outer ends of said first-named plates and the periphery of the bowl and terminating at its lower end above the bottom of the bowl, forming passages respectively between said annular wall and the periphery of the bowl, and between said annular wall and the outer ends of said first-named plates.

Signed by me at Stockholm, Sweden, this 17th day of February, 1898.

JOHN JOSEPH BERRIGAN.

Witnesses:
E. D. WINSLOW,
TH. WAWRINSKY.